(12) United States Patent
Gmach et al.

(10) Patent No.: US 8,838,423 B2
(45) Date of Patent: Sep. 16, 2014

(54) MANAGING AN INFRASTRUCTURE

(75) Inventors: Daniel Juergen Gmach, Palo Alto, CA (US); Yuan Chen, Sunnyvale, CA (US); Amip J. Shah, Santa Clara, CA (US); Jerome Rolia, Kanata (CA); Cullen E. Bash, Los Gatos, CA (US); Thomas W. Christian, Fort Collins, CO (US); Ratnesh Kumar Sharma, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 12/915,212

(22) Filed: Oct. 29, 2010

(65) Prior Publication Data

US 2012/0109605 A1    May 3, 2012

(51) Int. Cl.
*G06G 7/48* (2006.01)
*G06Q 10/06* (2012.01)

(52) U.S. Cl.
CPC .................. *G06Q 10/0631* (2013.01)
USPC ................................................. 703/6; 703/21

(58) Field of Classification Search
USPC ....................................................... 703/6, 21
See application file for complete search history.

(56) References Cited

U.S. PATENT DOCUMENTS

| | | | |
|---|---|---|---|
| 2008/0184230 A1 | 7/2008 | Leech et al. | |
| 2008/0271038 A1* | 10/2008 | Rolia et al. | 718/105 |
| 2008/0271039 A1* | 10/2008 | Rolia et al. | 718/105 |
| 2009/0216910 A1* | 8/2009 | Duchesneau | 709/250 |
| 2009/0228726 A1 | 9/2009 | Malik et al. | |
| 2009/0281677 A1 | 11/2009 | Botich et al. | |
| 2011/0282982 A1* | 11/2011 | Jain | 709/223 |

OTHER PUBLICATIONS

Gmach, Daniel et al., "Profiling Sustainability of Data Centers", Jul. 7, 2010.*
Banerjee, Prith et al., "Sustainable Data Centers: Enabled by Supply and Demand Side Management", Jul. 8, 2009.*
Padala, Pradeep et al., "Adaptive Control of Virtualized Resources in Utility Computing Environments", Mar. 21-23, 2007, EuroSys '07, Lisboa, Portugal, ACM.*
Banerjee, Prith et al., "Sustainable Data Centers: Enabled by Supply and Demand Side Management", Jul. 2009, Proceedings of the 46th Annual Design Automation Conference, ACM.*
Sharma, Ratnesh K. et al., "On Building Next Generation Data Centers", 2008, ACM.*

(Continued)

*Primary Examiner* — Kamini S Shah
*Assistant Examiner* — Cedric D Johnson

(57) ABSTRACT

In a method for managing an infrastructure, a utilization of a plurality of infrastructure components in performing an objective is simulated. In addition, a resource demand for the infrastructure associated with the simulated utilization of the infrastructure components is determined and a supply of resources by a plurality of available sources to meet the determined resource demand is simulated. Moreover, at least one metric associated with the determined resource demand and the simulated supply of resources by the plurality of available sources is determined.

16 Claims, 3 Drawing Sheets

(56) References Cited

OTHER PUBLICATIONS

Banerjee, Prith, Chandrakant D. Patel, Cullen Bash and Parthasarathy Ranganathan, "Sustainable Data Centers: Enabled by Supply and Demand Side Management", < http://www.hpl.hp.com/environment/SustainableDatacenters.pdf > Jul. 26-31, 2009.

Govindan, Sriram, Jeonghwan Choi, Bhuvan Urgaonkar, Anand Sivasubramaniam, and Andrea Baldini, "Statistical Profiling-based Techniques for Effective Power Provisioning in Data Centers", < http://portal.acm.org/citation.cfm?id=1519065.1519099&coll=GUIDE&dl=GUIDE&CFID=85826859&CFTOKEN=48873915 > Apr. 1-3, 2009, pp. 317-330.

Feng, Xizhou, Rong Ge, and Kirk W. Cameron, "Power and Energy Profiling of Scientific Applications on Distributed Systems" < http://scape.cs.vt.edu/?q=node/19 >, Feb. 13, 2005.

Gmach, Daniel, Yuan Chen, Amip Shah, Jerry Rolia, Cullen Bash, Tom Christian, and Ratnesh Sharma, "Profiling Sustainability of Data Centers", May 17-19, 2010.

\* cited by examiner

MANAGING AN INFRASTRUCTURE

CROSS-REFERENCE TO RELATED APPLICATION

The present disclosure contains some common subject matter with co-pending and commonly assigned U.S. patent application Ser. No. 12/916,292, entitled "Generating a Resource Management Plan for an Infrastructure", filed on Oct. 29, 2010, the disclosure of which is hereby incorporated by reference in its entirety.

BACKGROUND

It is estimated that the information and communication technology sector (ICT) is responsible for 2% of global energy use and carbon emissions. Much of this is due to the energy consumption of data centers. Significant research is underway to develop technologies that reduce energy use and the environmental impact of data centers. On the demand side, virtualization technology is being used to consolidate workload and facilitate information technology (IT) utilization and reduce IT power consumption. Cooling technologies, such as, air-side economizers, and the direct use of outside air further help facilitate data center cooling efficiency. On the supply side, renewable energy and distributed power supply management are being developed to reduce environment impact and cost.

However, the joint behavior of these technologies in an integrated supply demand context is difficult to predict. In particular, the interaction of the technologies with each data center's unique workloads is difficult to predict.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are apparatuses and methods for managing an infrastructure having infrastructure components. The infrastructure components may include information technology (IT) equipment, such as, but not limited to servers, network switches, routers, firewalls, intrusion detection systems, intrusion prevention systems, hard disks, monitors, power supplies, and other components typically found in computer networking environments. The infrastructure may also include facility equipment, such as, but not limited to facility power supply equipment, air conditioning systems, air moving systems, water chillers, and other equipment typically found in operating computer networking environments. In one regard, the infrastructure comprises at least one computer room or container, such as, but not limited to an IT data center that houses the infrastructure components. In addition, throughout the present disclosure, the term "managing" is intended to encompass either or both of designing and operating the infrastructure.

The apparatuses and methods disclosed herein are to manage the infrastructure through an integrated analysis of the resource supply side and the resource demand side of the infrastructure. The integrated analysis includes the evaluation of multiple resource supply side and resource demand side design alternatives, as well as multiple infrastructure component and facilities management policies to enable the evaluation and comparison of various alternative approaches to supply the infrastructure with resources. In one regard, the integrated analysis may be employed to determine the most cost effective and sustainable approach to managing the infrastructure. In addition, the integrated analysis may also consider varying resource demands over time as well as location specific time varying resource supplies in determining the most cost effective and sustainable approach.

Figure 1:
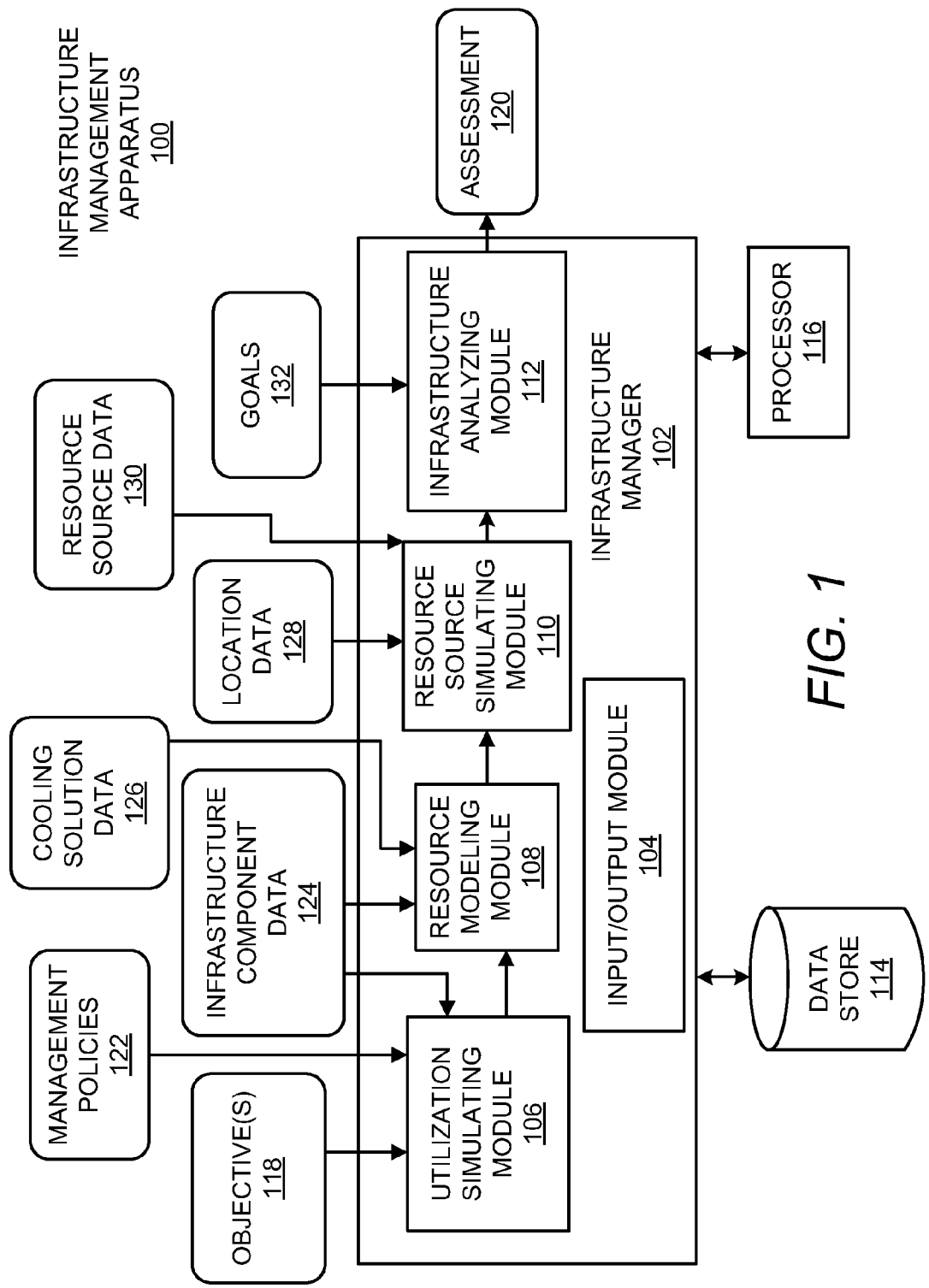
FIG. 1 illustrates a simplified block diagram of an infrastructure management apparatus, according to an example of the present disclosure.

With reference first to FIG. 1, there is shown a simplified block diagram of an infrastructure management apparatus 100, according to an example. The infrastructure management apparatus 100 is depicted as including an infrastructure manager 102, a data store 114, and a processor 116. It should be understood that the infrastructure management apparatus 100 may include additional elements and that some of the elements described herein may be removed and/or modified without departing from a scope of the infrastructure management apparatus 100.

The infrastructure manager 102 is depicted as including an input/output module 104, an utilization simulating module 106, a resource modeling module 108, a resource source simulating module 110, and an infrastructure analyzing module 112. Various manners in which the modules 104-112 operate are discussed in detail herein below.

According to an example, the infrastructure manager 102 comprises machine readable instructions stored, for instance, in a volatile or non-volatile memory, such as DRAM, EEPROM, MRAM, flash memory, floppy disk, a CD-ROM, a DVD-ROM, or other optical or magnetic media, and the like. In this example, the modules 104-112 comprise modules with machine readable instructions stored in the memory, which are executable by a processor of a computing device. According to another example, the infrastructure manager 102 comprises a hardware device, such as, a circuit or multiple circuits arranged on a board. In this example, the modules 104-112 comprise circuit components or individual circuits, which may also be controlled by the processor 116. According to a further example, the infrastructure manager 102 comprises a combination of modules with machine readable instructions and hardware modules. In addition, multiple processors may be employed to implement or execute the infrastructure manager 102.

The infrastructure management apparatus 100 may comprise a computing device and the infrastructure manager 102 may comprise an integrated and/or add-on hardware device of the computing device. As another example, the infrastructure manager 102 may comprise a computer readable storage device upon which machine readable instructions for each of the modules 104-112 are stored and executed by the processor 116.

Generally speaking, the infrastructure manager 102 is used to support a resource management plan that substantially matches the supply of resources with the demand for resource in an infrastructure. A resource management plan may include a choice for peak grid power, a mix of renewable resource sources, resource storage, and infrastructure component power management policies. The infrastructure manager 102 quantifies an overall impact of a plurality of different resource management approaches during design and/or operation of an infrastructure. For instance, during design of the infrastructure, the infrastructure manager 102 may quantify the impact of different design alternatives and management policies through simulation of a plurality of operating scenarios. During operation of the infrastructure, the infrastructure manager 102 is to provide recommendations regarding the resource demand over periods of time (for instance, the amount of power required), a relevant mix of available sources, and how the available sources should be allocated across the infrastructure over the periods of time. More particularly, for instance, the infrastructure manager 102 evaluates the impact of alternative management policies on time varying power supply needs during infrastructure operation.

Additionally, the infrastructure manager 102 is to perform an integrated analysis of power supply and demand of the infrastructure to determine the relationship between the power supply and the power demand. The infrastructure manager 102 may use the results of this analysis to provide automatic recommendations regarding resource supply mixes and how the resource supply should be allocated across the infrastructure, as described herein with respect to FIG. 2 and the method 200.

The recommendations regarding resource supply mixes may be based on goals 132 provided by an end user of the infrastructure manager 102. The goals 132 may comprise, for instance, acquisition costs, operational costs, sustainability metrics, resource access quality, Quality of Service (QoS) of the hosted application, etc. In one particular example, the end user may be provided with a number of options with respect to the goals 132, which the end user may select through an input source (not shown). The input source may comprise an interface device, such as, a keyboard, a mouse, or other input device.

According to an example, the infrastructure manager 102 receives the goals 132 and other data from the user through the input/output module 104 and may store the data in the data store 114. The infrastructure manager 102 may, however, obtain this information through alternative sources, such as, but not limited to, the data previously stored in the data store 114. As shown in FIG. 1, the other data may include at least one objective 118, management policies 122, infrastructure component data 124, cooling solution data 126, location data 128, resource source data 130, etc. The objective 118 may comprise, for instance, computational workloads that are likely to be performed by the infrastructure components based upon historical data and/or future demand predictions. The management policies 122 may comprise various policies, such as, but not limited to, use of virtual machine technology, provisions set forth in one or more service level agreements (SLAB), placement of workloads on selected servers, placement of workloads on servers located in selected areas of the infrastructure, etc. The infrastructure component data 124 may comprise, for instance, data pertaining to the types and placements of the infrastructure components installed in an existing infrastructure, data pertaining to available types of structure components that may be installed in a future or existing infrastructure, etc.

Thus, for instance, the infrastructure component data 124 may specify that the infrastructure has or is likely to have a particular number of one or more types of servers, a particular number of one or more types of network switches, etc. In addition, the infrastructure component data 124 may specify that the infrastructure has or is likely to have a particular number of one or more types of air conditioning units, a particular number of water chillers, a particular number and placement of one or more types of ventilation tiles, etc.

The cooling solution data 126 may comprise data pertaining to an existing cooling solution currently being used in or currently part of an existing infrastructure, or to an available cooling solution that may be used to replace and/or augment the existing cooling solution. The cooling solutions may include, for instance, the use of computer room air conditioning (CRAC) units, chillers, cooling towers, the use of underground heat exchangers, outside air cooling, etc.

The location data 128 comprises data pertaining to the physical location or environment in which the Infrastructure is located or is likely to be located. Thus, for instance, the location data 128 may indicate the average outside temperature over various periods of time, the average wind speeds over various periods of time, the amount of sun light available over various periods of time, etc.

The resource source data 130 comprises data pertaining to one or more resource sources for the infrastructure, which may include, for instance, photovoltaic panels, solar thermal power sources, municipal solid waste facilities, fuel cells, wind turbines, the electrical grid, etc. Thus, for instance, the resource source data 130 may include information pertaining to one or more available resource sources from which an existing infrastructure receives resources or a future infrastructure may receive resources.

The data store 114 comprises volatile or non-volatile memory, such as, but not limited to dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In any regard, the modules 106-112 may retrieve data from the data store 114 in performing their respective operations. Although the data store 114 has been depicted as forming a separate component from the infrastructure manager 102, it should be understood that the data store 114 may be integrated with the infrastructure manager 102 without departing from a scope of the infrastructure management apparatus 100. In this regard, the data store 114 may comprise a memory device located on the same circuit as the infrastructure manager 102 or may comprise a memory location of the computer readable medium upon which the machine readable instructions of the infrastructure manager 102 are stored.

Figure 2:
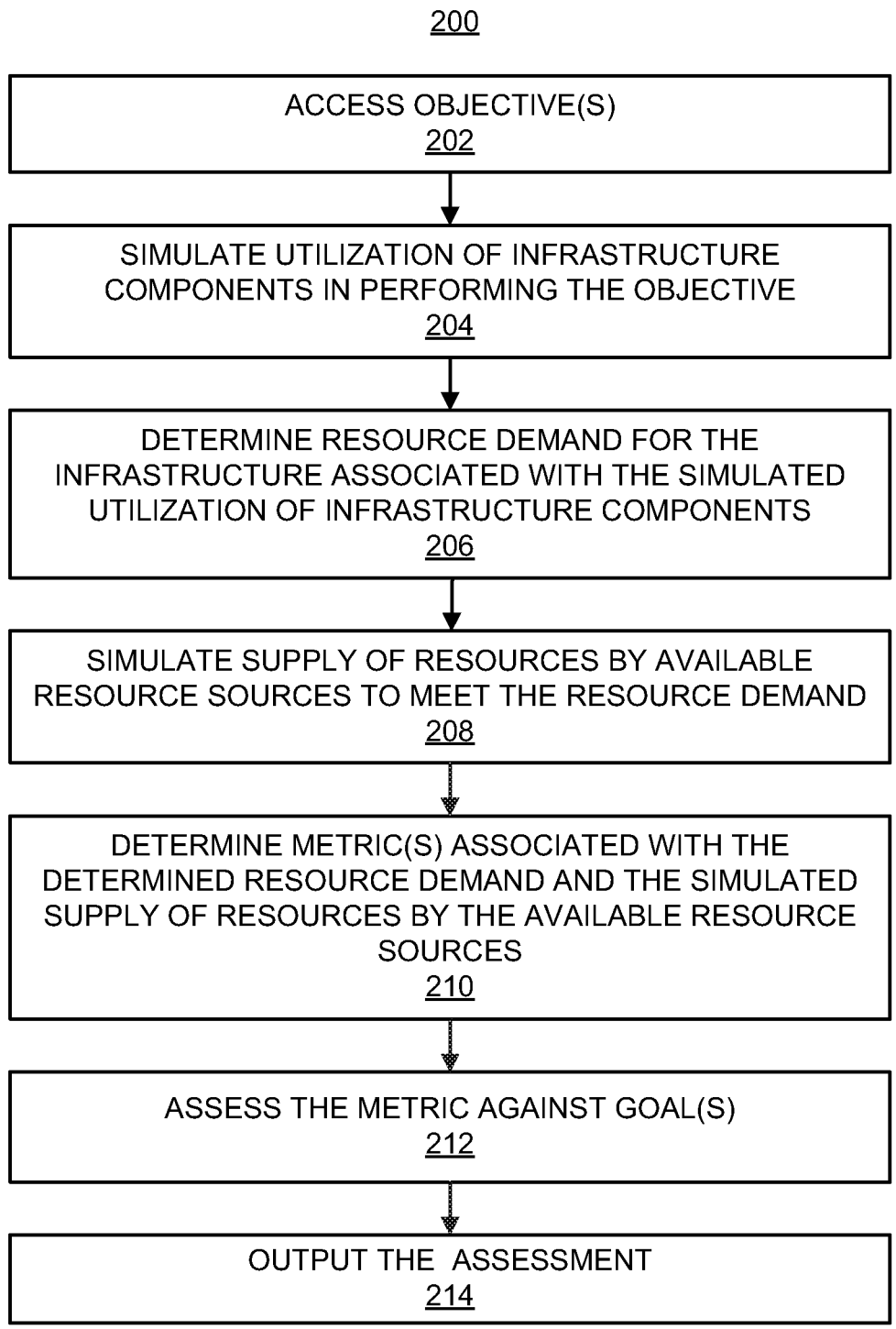
FIG. 2 illustrates a method of managing an infrastructure, according to an example of the present disclosure.

Various manners in which the modules 104-112 of the infrastructure manager 102 may operate in managing an infrastructure are discussed with respect to the method 200 depicted in FIG. 2. FIG. 2, more particularly depicts a flow diagram of a method 200 of managing an infrastructure having infrastructure components, according to an example. It should be readily apparent that the method discussed below with respect to FIG. 2 represents a generalized illustration and that other processes may be added or existing processes may be removed, modified or rearranged without departing from a scope of the method 200.

Although particular reference is made to the infrastructure management apparatus 100 depicted in FIG. 1 as performing the method 200, it should be understood that the method 200 may be performed by a differently configured apparatus without departing from a scope of the method 200.

At block 202, at least one objective 118 that is performable by the infrastructure components is accessed, for instance, through the input/output module 104. The objective(s) 118 may be based upon, for instance, historical data and/or future objective demand predictions. In any regard, the objective(s) 118 may be accessed through receipt of the objective(s) 118 from a user input, through access of the information stored on the data store 114, or through other sources.

At block 204, the utilization of infrastructure components in performing the objective(s) 118 is simulated, for instance, by the utilization simulating module 106. More particularly, for instance, the utilization simulating module 106 may simulate the placement of the objective(s) 118 on one or more of the infrastructure structures, in which, the placement is based upon a set of constraints. The set of constraints may include, for instance, the capabilities of the infrastructure components to perform the objective(s) 118, the capabilities of cooling systems to cool the infrastructure components, the provisions set forth in the management policies 122, etc. The utilization simulating module 106 may also simulate the utilization of the infrastructure components while ensuring that the utilizations meet provisions contained in one or more service level agreements (SLAs).

Thus, for instance, the utilization simulating module 106 may determine one or more placement scenarios for the objective(s) 118, which may comprise a computational workload, as well as the cooling requirements resulting from the one or more placement scenarios. In addition, or alternatively, in designing an infrastructure, the utilization simulating module 106 may also simulate various infrastructure components. Thus, for instance, the utilization simulating module 106 may perform a first simulation involving a first plurality of infrastructure components to perform the objective(s) 118, a first plurality of facility equipment associated with utilization of the first plurality of infrastructure components, under a first management policy. The utilization simulating module 106 may vary one or more of the infrastructure components, facility equipment, and the management policy in performing subsequent simulations. In addition, the utilization simulating module 106 may determine one or more metrics associated with quality of service (QoS) associated with performing the objective(s) 118.

In one regard, therefore, the utilization simulating module 106 provides time-varying information on the requirements of the infrastructure components to perform the objective(s) 118, the utilization values of the Infrastructure components in performing the objective(s) 118, QoS metrics associated with performing the objective(s) 118, substantially ensures that SLAs are being met, etc.

At block 206, resource demand for the infrastructure associated with the simulated utilization of the infrastructure components determined at block 204 is determined, for instance, by the resource modeling module 108. More particularly, for instance, the resource modeling module 108 may determine the aggregate resource demand of the infrastructure to perform the objective(s) 118 as a function of time, since the resource demand may vary, for instance, on the time of day at which the infrastructure component(s) is performing the objective(s) 118. By way of example, outside air may be used to supplement cooling at night, which may reduce the amount of power required to operate the cooling systems.

According to an example, the resource modeling module 108 may estimate the resource demand for the infrastructure based on the simulated utilization of the infrastructure components using:

$$P_t = \Sigma_{n=1}^{N} P_{t,n} + P_{network},  \qquad \text{Eqn (1)}$$

in which $P_t$ is the resource demand for the Infrastructure components, such as, servers, and $P_{network}$ is a fixed offset based on power consumption of networking switches. In addition, $$P_{t,n} = P_n^{idle} + (P_n^{busy} - P_n^{idle}) * u_{t,n}, \qquad \text{Eqn (2)}$$

in which $P_t$, is the estimated power consumption level for each server n at a time t, which may be determined through linear approximation. In addition, $P_n^{idle}$ is the power consumption level for each server n at an idle state and $P_n^{busy}$ is the power consumption level for each server n at a fully utilized state. Moreover, $u_{t,n}$ is an average central processor unit (CPU) utilization level of each server n over a time interval t, which may be derived from the utilization levels utilization levels determined at block 204.

As noted in Eqn (1), the sum of the power consumption of all of the servers, with the addition of the networking switches, is considered as resulting in a total IT equipment power consumption. As this equation does not consider all of the other equipment, such as, hard drives, monitors, power supplies, etc., contained in the infrastructure, the equation may be calibrated to more closely model actual resource demands of the IT equipment through use of historical data or experiments.

In order to determine the aggregate resource demand of the infrastructure, the power modeling module 108 may also determine the resource demands of the facility equipment, including the power distribution infrastructure and the cooling infrastructure of the infrastructure. According to an example, the power modeling module 108 may determine the aggregate resource demand using a power usage effectiveness (PUE) metric, which is a ratio of the total power used by the infrastructure to the power used by the infrastructure components, such as, the IT equipment, itself. The PUE represents the additional power consumption by the facility equipment, the power distribution infrastructure, and the cooling infrastructure. The power modeling module 108 may estimate the PUE from simulation or through historically averaged data for similar infrastructure solutions.

At block 208, a supply of resources by a plurality of available sources to meet the resource demand determined at block 206 is simulated, for instance, by the resource source simulating module 110. Thus, by way of example, the resource source simulating module 110 simulates the resource supply produced by one or more combinations of available resource sources. In addition, the resource source simulating module 110 assesses different resource supply solutions based upon the location data 128 and the resource source data 130. More particularly, for instance, the resource source simulating module 110 assesses location data, climate information, and various resource source supply solutions. The location data 128 may include, for instance, the length of time during the day that sunlight is available, the average wind speeds, etc., of the infrastructure location. The various resource source supply solutions may include, for instance, photovoltaic panels, wind turbines, municipal solid waste power plants, and other renewable resource sources, as well as the electrical grid.

According to an example, the resource source simulating module 110 is to simulate time-varying traces for the estimated resource source supply to the infrastructure for various combinations of the available sources. The time-varying traces generally capture the impact of geographical and climate characteristics for the locations either considered for the infrastructure or the location of and existing infrastructure. In addition to the traces, the resource source supply simulating module 110 may determine statistical meta data as the mean and variability of resource source supply, that is, the power changes between consecutive measurement intervals. The resource source supply simulating module 110 may consider the power changes between consecutive measurement intervals because they describe how flexible and fast the infrastructure needs to be to adapt to changes in resource source supply. In addition, the resource source simulating module 110 may provide data that may be used to evaluate different combinations of available resource sources during the infrastructure design phase to assist in finding the most cost-effective and sustainable supply solution for the infrastructure.

At block 210, at least one metric associated with the determined resource demand and the simulated supply of resources by the available resource sources is determined, for instance, by the infrastructure analyzing module 112. More particularly, for instance, the infrastructure analyzing module 112 may perform an integrated analysis of the resource demand determined at block 206 and the contributions of multiple available resource sources to determine the relationship between the resource supply and the resource demand of the infrastructure. In addition, the infrastructure analyzing module 112 may perform the integrated analysis to determine the relationship as it varies over time.

The at least one metric may comprise at least one of acquisition costs, operational costs, sustainability metrics, resource access quality, QoS of the hosted application, etc. The sustainability metrics include, for instance, embedded footprint, $CO_2$ emissions, water consumption, etc. The resource access quality metrics measure whether the resource demands of objectives are satisfied, and if not by how much the supply falls short of the demand. QoS metrics measure whether or not QoS objectives, such as, but not limited to application response time, have been met, and if not by how much they fall short. Thus, for instance, the infrastructure analyzing module 112 may determine the at least one metric based upon various characteristics of the selected infrastructure components, the selected facilities equipment, as well as the selected mix of available resource sources.

According to an example, the at least one metric associated with operating the infrastructure is determined based upon a backup plan for the infrastructure. For instance, the infrastructure may require the use of additional resource supplies, such as, but not limited to, additional grid power, diesel generators, etc. The at least one metric may also be determined using a sensitivity analysis to determine how often and/or at what level the additional resource source is expected to be employed.

At block 212, an assessment 120 of the at least one metric is made to determine whether at least one of the goals 132 has been met by the infrastructure, for instance, by the infrastructure analyzing module 112. According to an example, the assessment 120 includes the different infrastructure components in the infrastructure as well as the mix of various available resource sources that were used to determine the at least one metric at block 210. The assessment 120 may also be based upon a proposed design of the infrastructure containing the different infrastructure components under review.

At block 214, the assessment may be outputted from the infrastructure manager 102, for instance, through the input/output module 104. In addition, the method 200 may be repeated for a number of different infrastructure component mixes, as well as, a number of different resource source mixes, to determine which of the various combinations results in the at least one metric that is substantially optimized.

The method 200 may therefore be employed to design a new infrastructure that is substantially optimized to perform desired objectives, while minimizing, for instance, the costs associated with supplying power to the infrastructure based upon the location of and the available sources for the infrastructure. In one regard, the method 200 may be repeated for a number of iterations with different combinations of one or more of infrastructure components, facility equipment, cooling solutions, and available resource sources.

Some or all of the operations set forth in the method 200 may be contained as utilities, programs, or subprograms, in any desired computer accessible medium. In addition, the method 200 may be embodied by computer programs, which may exist in a variety of forms both active and inactive. For example, they may exist as machine readable instructions, including software program(s) comprised of program instructions in source code, object code, executable code or other formats. Any of the above may be embodied on a computer readable storage medium.

Example computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 3:
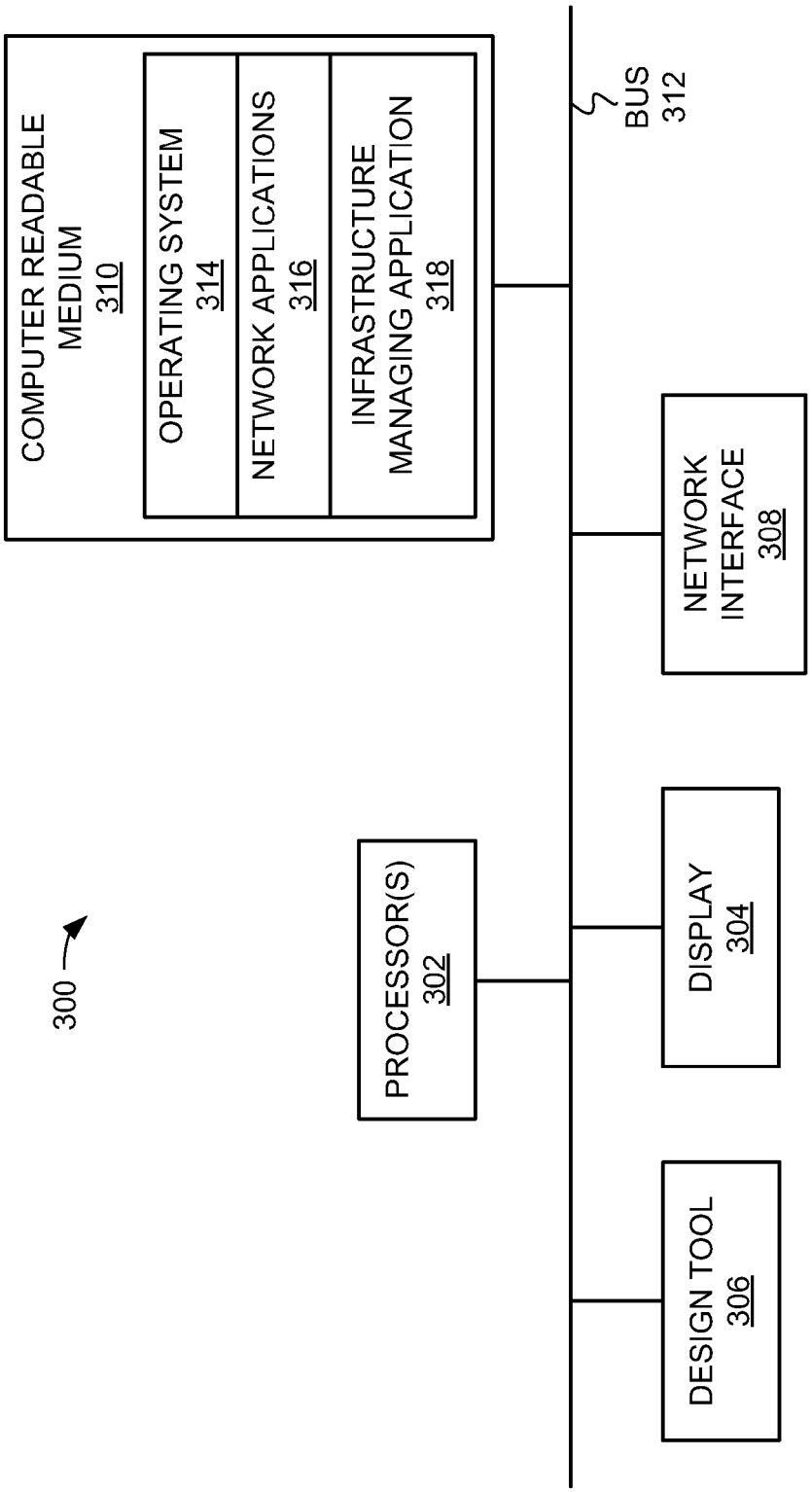
FIG. 3 illustrates a block diagram of a computing apparatus configured to implement the method depicted in FIG. 2, according to example of the present disclosure.

Turning now to FIG. 3, there is shown a schematic representation of a computing device 300 that may be used as a platform for implementing or executing the processes depicted in FIG. 2, according an example. The device 300 includes one or more processors 302, such as a central processing unit; one or more display devices 304, such as a monitor; one or more network interfaces 308, such as a Local Area Network LAN, a wireless 802.11x LAN, a 3G mobile WAN or a WiMax WAN; and a computer-readable medium 310. Each of these components is operatively coupled to one or more buses 312. For example, the bus 312 may be an EISA, a PCI, a USB, a FireWire, a NuBus, or a PDS.

The computer readable medium 310 may be any suitable medium that participates in providing instructions to the processor 302 for execution. For example, the computer readable medium 310 may be non-volatile media, such as an optical or a magnetic disk; volatile media, such as memory; and transmission media, such as coaxial cables, copper wire, and fiber optics. Transmission media may also take the form of acoustic, light, or radio frequency waves. The computer readable medium 310 has been depicted as also storing other machine readable instruction applications, including word processors, browsers, email, Instant Messaging, media players, and telephony machine readable instructions.

The computer-readable medium 310 has also been depicted as storing an operating system 314, such as Mac OS, MS Windows, Unix, or Linux; network applications 316; and an infrastructure managing application 318. The operating system 314 may be multi-user, multiprocessing, multitasking, multithreading, real-time and the like. The operating system 314 may also perform basic tasks, such as recognizing input from input devices, such as a keyboard or a keypad; sending output to the display 304 and the design tool 306; keeping track of files and directories on medium 310; controlling peripheral devices, such as disk drives, printers, image capture device; and managing traffic on the one or more buses 312. The network applications 316 include various components for establishing and maintaining network connections, such as machine readable instructions for implementing communication protocols including TCP/IP, HTTP, Ethernet, USB, and FireWire.

The infrastructure managing application 318 provides various components with machine readable instructions for providing computing services to users, as described above. In certain examples, some or all of the processes performed by the application 318 may be integrated into the operating system 314. In certain examples, the processes may be at least partially implemented in digital electronic circuitry, or in computer hardware, machine readable instructions (including firmware and/or software) or in any combination thereof.

What has been described and illustrated herein are various examples of the disclosure along with some of their variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for managing an infrastructure, said method comprising:
    simulating a utilization of each of a plurality of different combinations of infrastructure components in performing an objective, wherein the infrastructure components include a plurality of servers and the objective comprises a computational workload based upon at least one of historical data and future objective demand predictions, wherein the simulating of the utilization includes simulating a placement of the computational workload on the different combinations of the plurality of servers subject to at least one constraint associated with the different combinations of the plurality of servers performing the objective;
    determining a resource demand for the infrastructure associated with each of the simulated utilizations of the plurality of different combinations of infrastructure components;
    simulating supply of resources by a plurality of available sources to meet each of the determined resource demands, wherein each of the plurality of available sources is to supply resources to each of the infrastructure components;
    determining, using a processor, at least one metric associated with each of the determined resource demands and the simulated supply of resources by the plurality of available sources; and
    determining, by the processor, which of the plurality of different combinations of infrastructure components results in the at least one metric being optimized.

2. The method according to claim 1, wherein determining a resource demand for the infrastructure associated with each of the simulated utilizations of the plurality of different combinations of infrastructure components further comprises determining the resource demand for each of the plurality of different combinations of infrastructure components as a function of time.

3. The method according to claim 1, wherein the plurality of available sources comprise at least one renewable energy source and wherein simulating the supply of resources by a plurality of available sources further comprises simulating the supply of resources produced by a plurality of different available source combinations.

4. The method according to claim 1, wherein simulating the supply of resources by a plurality of available sources further comprises simulating the supply of resources based upon data pertaining to a location of the infrastructure and available sources.

5. The method according to claim 1, wherein simulating the supply of resources by a plurality of available sources further comprises simulating time-varying traces for the simulated resource supply to the infrastructure for various combinations of available sources, wherein the time-varying traces capture an impact of geographical and climate characteristics of the infrastructure location.

6. The method according to claim 1, wherein the at least one metric comprises at least one of acquisition costs, operational costs, sustainability metrics, resource access quality, and QoS of a hosted application.

7. The method according to claim 1, further comprising:
    assessing the at least one metric to determine whether the infrastructure has met at least one predetermined goal.

8. An apparatus for managing an infrastructure, said apparatus comprising:
    a processor; and
    a memory on which is stored machine readable instructions that when executed cause the processor to:
        simulate a utilization of each of a plurality of different combinations of infrastructure components in performing an objective, wherein the infrastructure components include a plurality of servers and the objective comprises a computational workload based upon at least one of historical data and future objective demand predictions, wherein to simulate the utilization, the processor is to simulate a placement of the computational workload on the different combinations of the plurality of servers subject to at least one constraint associated with the different combinations of the plurality of servers performing the objective;
        determine a resource demand for the infrastructure associated with each of the simulated utilizations of the plurality of different combinations of infrastructure components;
        simulate a supply of resources by a plurality of available sources to meet each of the determined resource demands, wherein each of the plurality of available sources is to supply resources to each of the infrastructure components;
        determine at least one metric associated with each of the determined resource demands and the simulated supply of resources by the plurality of available sources; and
        determine which combination of the plurality of different combinations of infrastructure components results in the at least one metric being optimized.

9. The apparatus according to claim 8, wherein the machine readable instructions are to further cause the processor to determine the resource demand for each of the plurality of different combinations of infrastructure components as a function of time.

10. The apparatus according to claim 9, wherein the plurality of available sources comprise at least one renewable energy source and wherein the machine readable instructions are to further cause the processor to simulate the supply of resources produced by a plurality of different available source combinations.

11. The apparatus according to claim 8, wherein the machine readable instructions are to further cause the processor to simulate the supply of power based upon data pertaining to a location of the infrastructure and available sources.

12. The apparatus according to claim 8, wherein the machine readable instructions are to further cause the processor to simulate time-varying traces for the simulated resource supply to the infrastructure for various combinations of available sources, wherein the time-varying traces capture an impact of geographical and climate characteristics of the infrastructure location.

13. The apparatus according to claim 8, wherein the at least one metric comprises at least one of acquisition costs, operational costs, sustainability metrics, resource access quality, and QoS of a hosted application.

14. The apparatus according to claim 8, wherein the machine readable instructions are to further cause the processor to assess the at least one metric to determine whether the infrastructure has met at least one predetermined goal.

15. A non-transitory computer readable storage medium on which is embedded at least one computer program that, when executed by a processor is to cause the processor to:

- simulate a utilization of each of a plurality of different combinations of infrastructure components in performing an objective;
- determine a resource demand for the infrastructure associated with each of the simulated utilizations of the plurality of different combinations of infrastructure components, wherein the infrastructure components include a plurality of servers and the objective comprises a computational workload based upon at least one of historical data and future objective demand predictions, wherein to simulate the utilization, the processor is to simulate a placement of the computational workload on the different combinations of the plurality of servers subject to at least one constraint associated with the different combinations of the plurality of servers performing the objective;
- simulate supply of resources by a plurality of available sources to meet each of the determined resource demands, wherein each of the plurality of available sources is to supply resources to each of the infrastructure components;
- determine at least one metric associated with each of the determined resource demands and the simulated supply of resources of power by the plurality of available sources; and
- determine which combination of the plurality of different combinations of infrastructure components results in the at least one metric being optimized.

16. The non-transitory computer readable storage medium according to claim 15, wherein the plurality of available sources comprise at least one renewable energy source, and wherein to simulate the supply of resources by a plurality of available sources, the at least one computer program is to further cause the processor to simulate the supply of resources produced by a plurality of different available source combinations.

* * * * *